(12) United States Patent
Smithers et al.

(10) Patent No.: US 9,679,348 B2
(45) Date of Patent: Jun. 13, 2017

(54) STORAGE AND COMPRESSION METHODS FOR ANIMATED IMAGES

(71) Applicant: Disney Enterprises, Inc., Burbank, CA (US)

(72) Inventors: Andi T. Smithers, San Diego, CA (US); Gary Frattarola, San Diego, CA (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 264 days.

(21) Appl. No.: 14/278,878

(22) Filed: May 15, 2014

(65) Prior Publication Data

US 2015/0334403 A1 Nov. 19, 2015

(51) Int. Cl.
*G06F 12/10* (2016.01)
*G06T 1/60* (2006.01)
*G06T 9/00* (2006.01)
*H04N 19/172* (2014.01)
*H04N 19/176* (2014.01)
*H04N 1/32* (2006.01)
*H04N 19/61* (2014.01)
*H04N 19/42* (2014.01)
*H04N 19/105* (2014.01)
*H04N 19/159* (2014.01)

(52) U.S. Cl.
CPC ............... *G06T 1/60* (2013.01); *G06T 9/00* (2013.01); *H04N 1/32224* (2013.01); *H04N 1/32235* (2013.01); *H04N 19/105* (2014.11); *H04N 19/159* (2014.11); *H04N 19/172* (2014.11); *H04N 19/176* (2014.11); *H04N 19/42* (2014.11); *H04N 19/61* (2014.11)

(58) Field of Classification Search
CPC .... H04N 19/122; H04N 19/172; H04N 19/61; H04N 19/105; H04N 19/159; H04N 19/176; H04N 19/42; H04N 1/32224; H04N 1/32235; G06T 9/00; G06T 1/60
See application file for complete search history.

(56) References Cited

U.S. PATENT DOCUMENTS

| | | | |
|---|---|---|---|
| 6,693,644 B1 * | 2/2004 | Moriwaki | G06T 17/00 345/600 |
| 2009/0160857 A1 * | 6/2009 | Rasmusson | G06T 15/04 345/422 |
| 2014/0267283 A1 * | 9/2014 | Nystad | G06T 9/00 345/428 |

* cited by examiner

*Primary Examiner* — Robert Craddock
(74) *Attorney, Agent, or Firm* — Dorsey & Whitney LLP (57) ABSTRACT

The present disclosure is related to a method for creating hardware texture content for display on a display of a computing device. The method includes receiving by a processor the content in an image file format, where the content includes a first frame and a second frame. After receiving the content, the method includes creating by the processor a first hardware file corresponding to the first frame and creating by the processor a second hardware file corresponding to the second frame. After creating the first and second frames, the method further includes determining by the processing element a first delta hardware file corresponding to changes between the first hardware file and the second hardware file. In the method the first hardware file, the second hardware file, and the first delta hardware file include data directly usable by a graphics processing unit.

16 Claims, 9 Drawing Sheets

STORAGE AND COMPRESSION METHODS FOR ANIMATED IMAGES

FIELD

The present invention relates generally to rendering of images on a display, and more specifically, to rendering of frame-based animated computer graphic images on a display.

BACKGROUND

Computing devices, such as personal computers and mobile electronic devices, typically include display screens that are used to provide visual output to a user. Often, there is a desire to display content including multiple frames, such as animated content that demonstrates movement or other variations between frames of the content. Many times, electronic devices are used to access web pages on the internet or other network. For example, many web pages or web-accessible programs (e.g., web-based video games, interactive websites, and so on), display content that includes two or more frames. Examples of this type of content include data displayed or stored as Graphics Interchange Format (GIF), animated portable graphics network (APNG), moving pictures experts group phase (MPEG or MPG), and so on.

Texture mapping typically involves mapping a source image onto a surface of a three-dimensional object, and thereafter mapping the textured three-dimensional object to the two-dimensional graphics display screen to display the resulting image. Many image file formats can be used as the source image to create the detail attributes. Examples of attributes that can be texture mapped include color, specular reflection, vector perturbation, specularity, transparency, shadows, surface irregularities and grading.

Current content storage and display methods for content and texture mapping may require a substantial amount of memory and upload time as data is transformed from a hardware data to data that can be easily used and accessed by a graphics processing unit (GPU). This results in content being rendered and thus displayed slowly, which can result in image artifacts such as glitches, image tearing, and the like, as well as resulting in preventing some systems with hardware limitations from rendering and displaying the content.

SUMMARY

Examples of the disclosure may include a method for creating hardware texture content for display on a display of a computing device. The method includes a processor receiving the content in an image file format, where the content includes a first frame and a second frame. After receiving the content, the method includes the processor creating a first hardware file corresponding to the first frame and a second hardware file corresponding to the second frame. After creating the first and second frames, the method further includes the processing element determining a first delta hardware file corresponding to changes between the first hardware file and the second hardware file. In the method, the first hardware file, the second hardware file, and the first delta hardware file include data directly usable by a graphics processing unit.

Another example of the present disclosure includes a computing device. The computing device includes a display, a memory component, and a main processing unit in communication with the display and the memory component. The main processing unit is configured to perform operations, including decompressing a content file, creating a plurality of texture frames from the decompressed content file, storing an initial texture frame in the memory component, and storing a plurality of delta frames in the memory component, wherein the plurality of delta frames comprises change data indicating changes between the initial texture frame and the respective delta frame.

Yet another example of the present disclosure includes a method for displaying frame-based content on a display. The method includes a graphics processing unit receiving a hardware animation content file; uploading a first texture frame comprising a first texture to a memory component of the graphics processing unit; directly by the graphics processing unit the first texture from the first texture frame; the graphics processing unit applying a first delta frame to the first texture frame to determine a first texture delta; uploading the first texture delta; and the graphics processing unit rendering an output image comprising the first texture and the first texture delta overlaid on the first texture.

SPECIFICATION

Overview

In some embodiments herein, a method for rendering animated images using hardware compatible data is disclosed. The method decodes frames of source content into one or more hardware texture frames. Once the frames are in a hardware accessible format, the method analyzes each hardware texture frame to generate one or more delta frames. The delta frames include data related to changes or deltas between an initial frame and a plurality of subsequent frames. For example, a delta frame may include data corresponding to a portion of the first frame, indicating the area of the first frame that changed and the data corresponding to the modification to the pixels of that area. After the delta frames have been generated, the method further includes compressing and storing the delta frames. At runtime, or whenever the content is desired to be displayed or rendered, the computing device accesses the first hardware compressed texture frame and renders the first frame, as the first frame is being rendered or displayed, the delta frames are overlaid on the first frame to render the subsequent frames.

In this embodiment, because the initial frame and the delta frames are stored as hardware compressed textures, the data is directly accessible by the processing element responsible for rendering the content (e.g., the GPU). This allows the GPU to directly use the frames, without requiring time-consuming swizzling, or other modifications to the data to transform the data into a hardware-friendly format. Further, the compressed hardware textures require less storage as compared to the uncompressed content, which reduces the amount of memory needed for the content.

The method may be used to format and compress image data for a variety of frame-based content, such as movies, animations, video clips, video games, computer-aided animation programs, virtual reality, or the like. These types of content may be accessible via a network or may be stored and rendered on the device itself (e.g., a video game). The method described herein may allow subsequent frames in a content to be rendered while the first frame or previous frame is being used for rendering, which helps to reduce glitches, artifacts in the displayed content, and prevents the images from tearing as well as helps to prevent frame rate stuttering.

As used herein the term "texture" is meant to encompass data, such as image data, that uses red, green, blue, and optionally alpha (RGB(a)) values or other color spaces (e.g., cyan, magenta, yellow, and key (CMKY), HSL, etc.) to assign pixels of a display a particular color. In short, the term texture is meant to encompass data for mapping surface detail or color (e.g., texture mapping) onto an object, as well as data for creating an image and objects within the image. In some instances the term texture may encompass instances where the color space used initially may change to another color space when compressed. A texture may be substantially anything rendered by Open Graphics Library (OpenGL), Microsoft Direct X, $Š^2$, or other programming interfaces for rendering two-dimensional and three-dimensional graphics. Additionally, the term "texture compression format" is meant to encompass data compression that is optimized for random access memory or other memory types that are primarily used by the GPU core or other parallel rendering component to render an image. For example, data in texture format is able to be decompressed by the GPU, rather than requiring a central processing unit (CPU) for decompression, which allows the image or other data to stay in the compressed format up until the image is rendered. It should be noted that the term GPU is meant to encompass components that can perform a plurality of parallel computations to render images.

For example, in many instances, texture mapping may apply one or more point texture elements ("texels") to each point element or pixel of the displayed portion of the object to which the texture is being mapped. Texture mapping hardware provides information detailing the manner in which the texels of a texture map correspond to the pixels on the display screen that represent the object. In some instances, each texel in a texture map is defined by S and T coordinates which identify its location in the two-dimensional texture map. For each pixel, the corresponding texel or texels that map to it are accessed from the texture map, and incorporated into the final R, G, B values (or other color space values) generated for the pixel to represent the textured object on the display screen.

It should be understood that each pixel in an object primitive may not map in a one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels are used to represent the object on the display screen, and each pixel that represents the object may map in a one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. Textures may also have three-dimensions, e.g., volumetric textures, and the depth may be selected based on Z. Textures having mid-levels may also require computation of their hardware images for those levels, for example through bilinear interpolation. In addition, each pixel may map into multiple texels when a texture is mapped to a small portion of an object. Resultant texel data is calculated for each pixel that maps to more than one texel. As it is common for a pixel to map to multiple texels, resultant texel data for a pixel typically represents an average of the texels that map to that pixel. Also included within the methods of the present disclosure are mipmaps that are predetermined images accompanying a main texture that can assist in rendering speed and reducing aliasing effects. The definition of texture used herein may encompass mipmaps and they may be processed along with or separate from the texture compression discussed herein.

DETAILED DESCRIPTION

Figure 1:
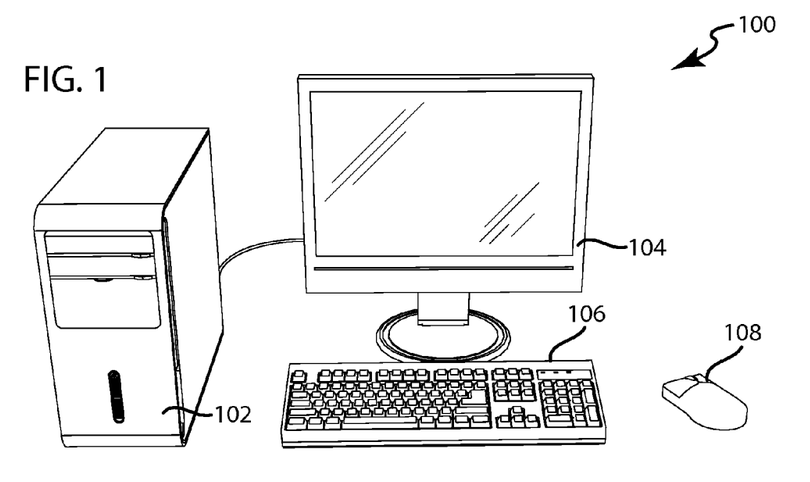
FIG. 1 is a perspective view of a system for rendering and displaying content.
Figure 2:
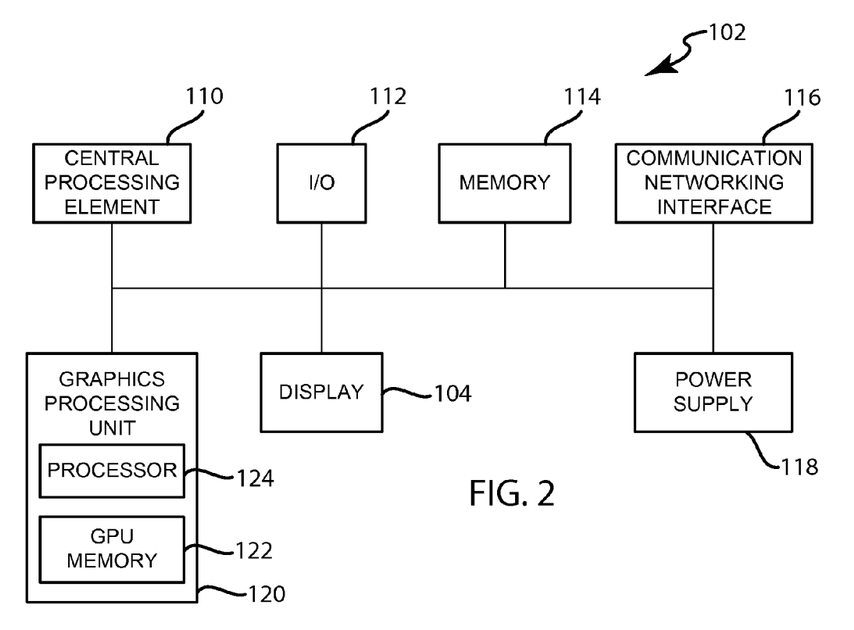
FIG. 2 is a simplified block diagram of the system of FIG. 1.

Turning to the figures, a system for compressing and rendering images in accordance with the present disclosure will now be discussed in more detail. FIG. 1 is a perspective view of a computing system for compressing and rendering images. FIG. 2 is a simplified block diagram of the system of FIG. 1. With reference to FIG. 1, the system 100 may include a computing device 102, a display 104, and one or more input/output devices such as a keyboard 106 and a mouse 108. Each of the components of the system 100 may be in communication with each other and optionally other devices, through a wired connection, wireless connection, or a combination of wired and wireless connections. Additionally, although the system 100 in FIG. 1 is illustrated as a desktop computing system with the display 104 and input/output devices being separated from each other, in other embodiments, the components may be integrated. For example, the computing device 102 may be a mobile electronic device such as a smart phone, tablet computer, portable gaming system, or the like. In these examples, two or more of the components may be integrated together.

The computing device 102 may be substantially any type of electronic device, such as, but not limited to, a computer, a server, a laptop computer, a tablet computer, a smart phone, a portable gaming device, a set top box, a video game console, or the like. Depending on the type of computing device 102 used, the display 104 may be integrated therewith or separate (as shown in FIG. 1).

The display 104 provides a visual output for the system 100 and the computing device 102. The display 104 may be, for example, a liquid crystal display, a plasma display, an organic light emitting diode display, a three-dimensional display, or the like. Additionally, the display 104 may include one or more input mechanisms, for example, one or more capacitive touch sensors, resistive touch sensors, or the like. In these embodiments, the display 104 may function to provide input and output functions for the system 100.

With reference to FIG. 2, the computing device 102 may include one or more processing elements 110, input/output devices 112, memory components 114, a communication/networking interface 116, a power supply, and a graphics processing unit 120. Each of the components will be discussed in turn below.

The one or more processing elements 110 may include a central processing unit, as well as one or more supplementary processing units. The processing element 110 may be substantially any type of electronic device capable of processing, receiving, and/or transmitting instructions. For example the processing element 110 may be a microprocessor or a microcomputer. Additionally, the processing element 110 may include one or more processors. For example, select components of the computing device 102 may be controlled by a first processing element and other components of the computing device 102 may be controlled by a second processing element, where the first and second processing elements may or may not be in communication with one another. The one or more processing elements 110 may be specialized for select tasks or may be more generalized, e.g., central processing unit.

The input/output devices 112 may include the keyboard 106 and the mouse 108, as well as other peripheral devices that can be used to provide input to the system 100 and/or computer 102. Examples of input/output devices 112 that may be used with the system 110 include a camera, stylus, track pad, joystick, remote control, buttons, switches, and the like. The input/output devices 112 may allow the user to provide input to the system 100, as well as provide output to a user as well. The types of input/output device 112 may vary based on the system 100, the computing device 102, and the desires of the user.

The memory components 114 are used to store electronic data that can be utilized by the computing device 102. The memory components 114 may store electronic data or content, e.g., image files, video files, audio files, document files, and so on, that correspond to various applications or programs. The memory 114 may be, for example, non-volatile storage, a magnetic storage medium, an optical storage medium, a magneto-optical storage medium, a read-only medium, random-access memory, uniform memory access, flash memory, erasable programmable memory, flash memory, or a combination of one or more types of computer data storage. The computing device 102 may include one or more memory components 114 that may be specialized or generalized.

The communication/network interface 116 provides communication to and from the computing device 102. For example, the communication/network interface 116 may transmit data to and from other computing devices through a wireless network (WiFi, Bluetooth, cellular network, etc.) or a wired network (Ethernet).

The power supply 118 provides power to various components of the computing device 102. The power supply 118 may include one or more rechargeable, disposable, or hardwire sources, e.g., batteries, power cord, or the like. Additionally, the power supply 118 may include one or more types of connectors or components that provide different types of power to the computing device 102.

The graphics processing unit 120 or GPU may be a component specialized to render images for output by the display 104. The GPU 120 may be integrated with the computing device 102 and/or the display 104, and may include one or more processing elements 124 and memory 122. The components 122, 124 of the GPU 120 may be specialized for graphics rendering. For example, the memory 122 may be similar to the memory 114, but in many instances may be random-access memory that is dual ported (able to be read and written at the same time). In this example, the memory 122 of the GPU 120 stores data for a plurality of pixels of the display 104 for rendering images on the display 104, and also provides buffering functions to store completed images until they are ready to be displayed. Because the GPU 120 includes its own memory 122, the GPU 120 can access image data without having to go through the main processing unit 110 to access the main memory 114, which can reduce the speed of image rendering. Additionally, although a single GPU 120 has been illustrated, in some embodiments the computing device 102 may include two or more GPUs 120 to provide increased rendering power and speed for the system 100.

Figure 3:
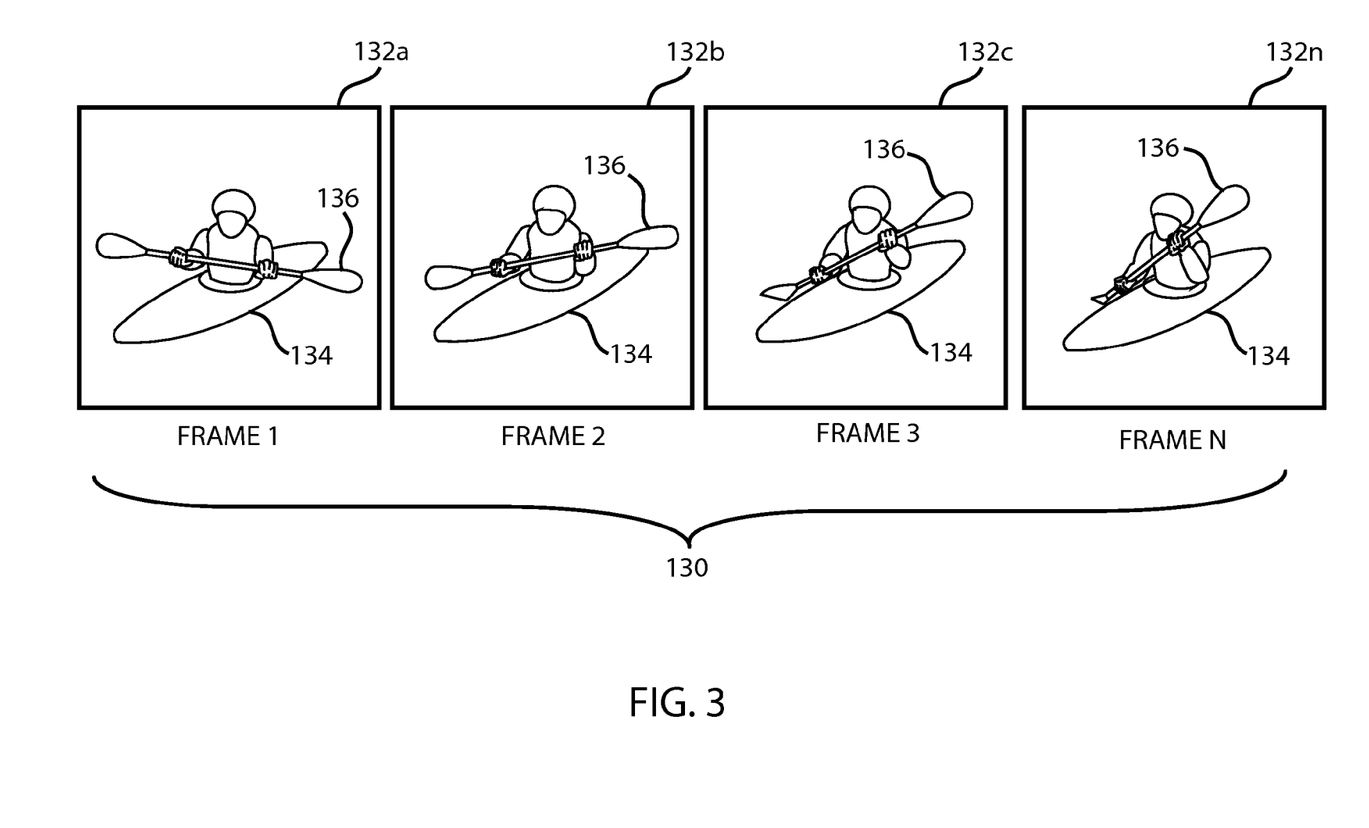
FIG. 3 depicts a plurality of frames for content to be displayed by the system 100.

Content that may be displayed and/or rendered by the system 100 will now be discussed. FIG. 3 depicts a plurality of frames for content to be displayed by the system 100. With reference to FIG. 3, the content 130 may include a plurality of frames 132a-132n. The frames 132a-132n are each images that are output by the display 104 by varying the output colors of the various pixels of the display 104. The content 130 may be substantially any frame-based content, such as, but not limited to, videos, video games, and motion capture systems. In instances where the content 130 is a movie or animation, the frames 132a-132n may be predetermined, whereas in instances where the content 130 is interactive or otherwise utilizes an input, the frames 132a-132n may be dynamically modified or created based on the input (e.g., a video game receiving a user input corresponding to a character's movement or appearance).

In many embodiments, the frames 132a-132n may include similar objects, but may demonstrate the movement of one or more elements of the objects between each frame 132a-132n. For example, a first frame 132a may illustrate a first object 134 having a first element 136 in a first position, the second frame 132b illustrates the first object 134 with the first element 136 in a second position, the third frame 132c illustrates the first object 134 with the first element 136 in a third position, and the final frame 132n illustrates the first object 134 with the first element 136 in a forth position. It should be noted that although FIG. 3 illustrates only the movement of a single element 134 through the frames 132a-132n in other examples, additional elements, objects, or scenes may be moved or otherwise varied through the frames 132a-132n.

Figure 4:
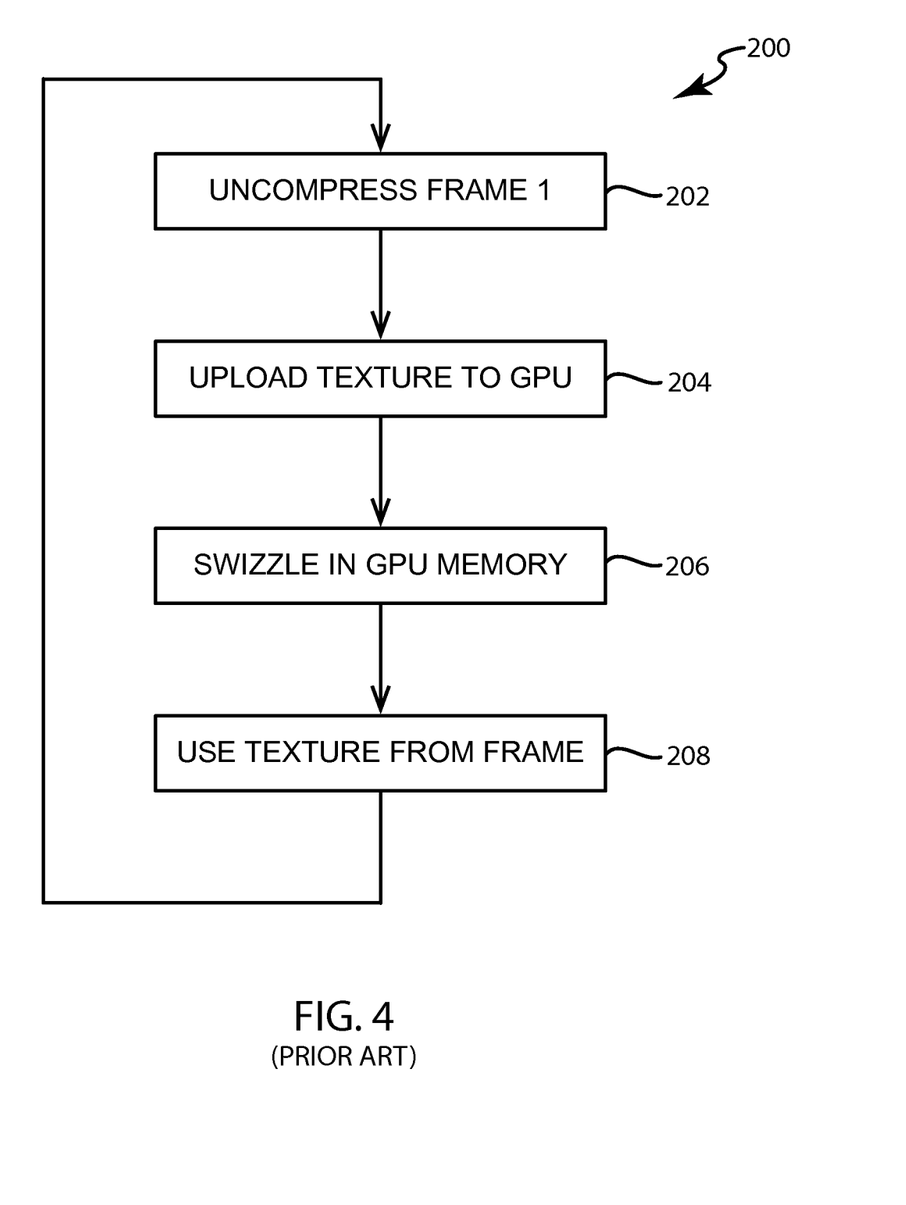
FIG. 4 is a flow chart illustrating a conventional rendering and compression process for animated content.

With reference to FIG. 4, a conventional rendering and compression process for the content 130 illustrated in FIG. 3 will now be discussed. With reference to FIG. 4, the method 200 may begin with operation 202 and the first frame 132a is decompressed into an uncompressed texture. During this decompression, the main memory 114 of the computing device 102 is typically used and the decompression process uses a large percentage of the memory 114. In other words, during this operation 202, the memory 114 may be substantially occupied by the decompression process which reduces the availability of the memory 114 use, typically random-access memory, for other applications which can introduce latency and lag into the computing device.

Once the first frame 132a has been decompressed, the method 200 will typically proceed to operation 204 and the texture for the first frame 132a is uploaded to the GPU 120. During the uploading process, the GPU memory 122, which in most instances is the random access memory (RAM) for the GPU 120, will be monopolized by the uploading of the uncompressed texture from the main memory 114. The uploading to the GPU memory 122 is required in order to render the image as a raw image.

Figure 5:
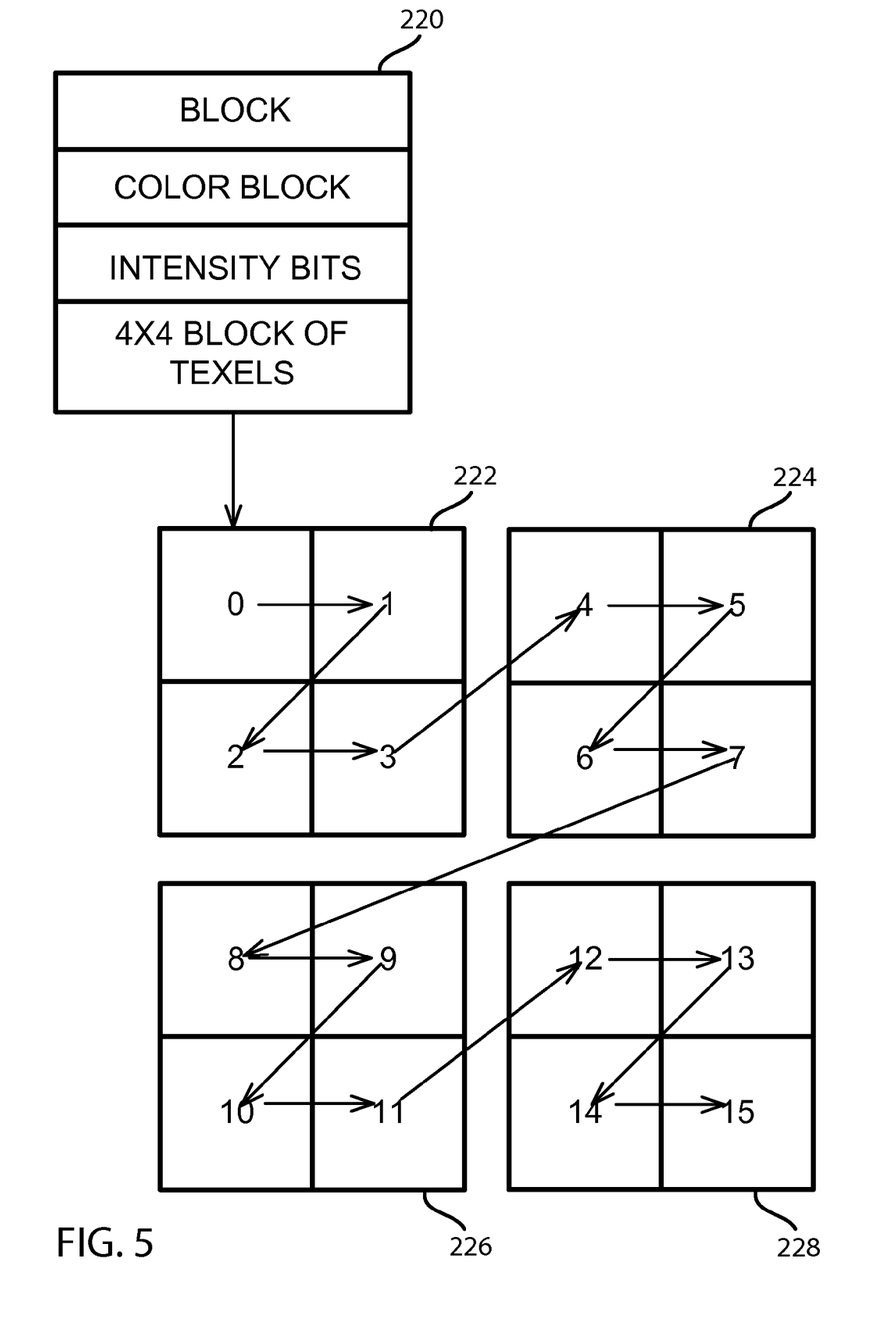
FIG. 5 is a block diagram illustrating a swizzling operation.

After the uncompressed texture is uploaded to the GPU memory 122, the method 200 typically proceeds to operation 206. In operation 206, the uncompressed texture of the first frame 132*a* is then swizzled into a hardware form. FIG. 5 is a block diagram illustrating a swizzling operation. With reference to FIG. 5, a tile of image data 220 that includes a color block, intensity bits, and a block of texels (texture pixel elements), is provided to a four-vector register 222. A swizzle operation is actuated to rearrange the data in additional registers 224, 226, and 228 by moving the block 220 laterally and diagonally between each register 224, 226, 228. The movement of the title 220 through the registers 224, 226, 228 is done in a Z-order (also known as a Morton-order) that maps the multidimensional data into one dimension while preserving the locality of the data. The swizzling operation takes time for the GPU 120 driver to process the data and to transform it into a hardware form before the data is usable by the GPU 120, which can delay the rendering of the first frame 132*a*. Additionally, the swizzling operation is done in a non-linear pattern, which makes the data output more difficult to predict than a linear operation and thus slows down output processing. In instances where the memory is uniform memory access, the swizzle operation to generate the Morton order may be done before or after an upload. The swizzling operation also may be done linearly in place, meaning that the texture is generated and then manipulated prior to use, which may also make the data output more difficult to predict and slow down output processing.

With reference again to FIG. 4, once the data from block 220 has been swizzled, the method 200 proceeds to operation 208. In operation 208, the texture corresponding to the first frame 132*a* is used. However, typically latency is introduced into the system before the texture can be used. With reference to FIG. 4, after operation 208, the method 200 returns to operation 202 and repeats for the next frame. In this manner, the frame is decompressed, the texture is uploaded to the GPU 120 and the texture is swizzled in the GPU memory 122 prior to the texture being able to be used by the GPU 120. This method takes a substantial amount of time and uses large components of both the main memory 114 and the GPU memory 122, which can prevent other applications from running, as well as introduce latency and other effects into the system. For example, in instances where the content 130 may be an animated image used for a website image, such as an APNG, the APNG will require large amounts of RAM and uploading to the GPU for rendering, which is costly from a time and resource perspective, additionally, not all hardware can support streamed dynamic images at frame rates that are desired.

Figure 6:
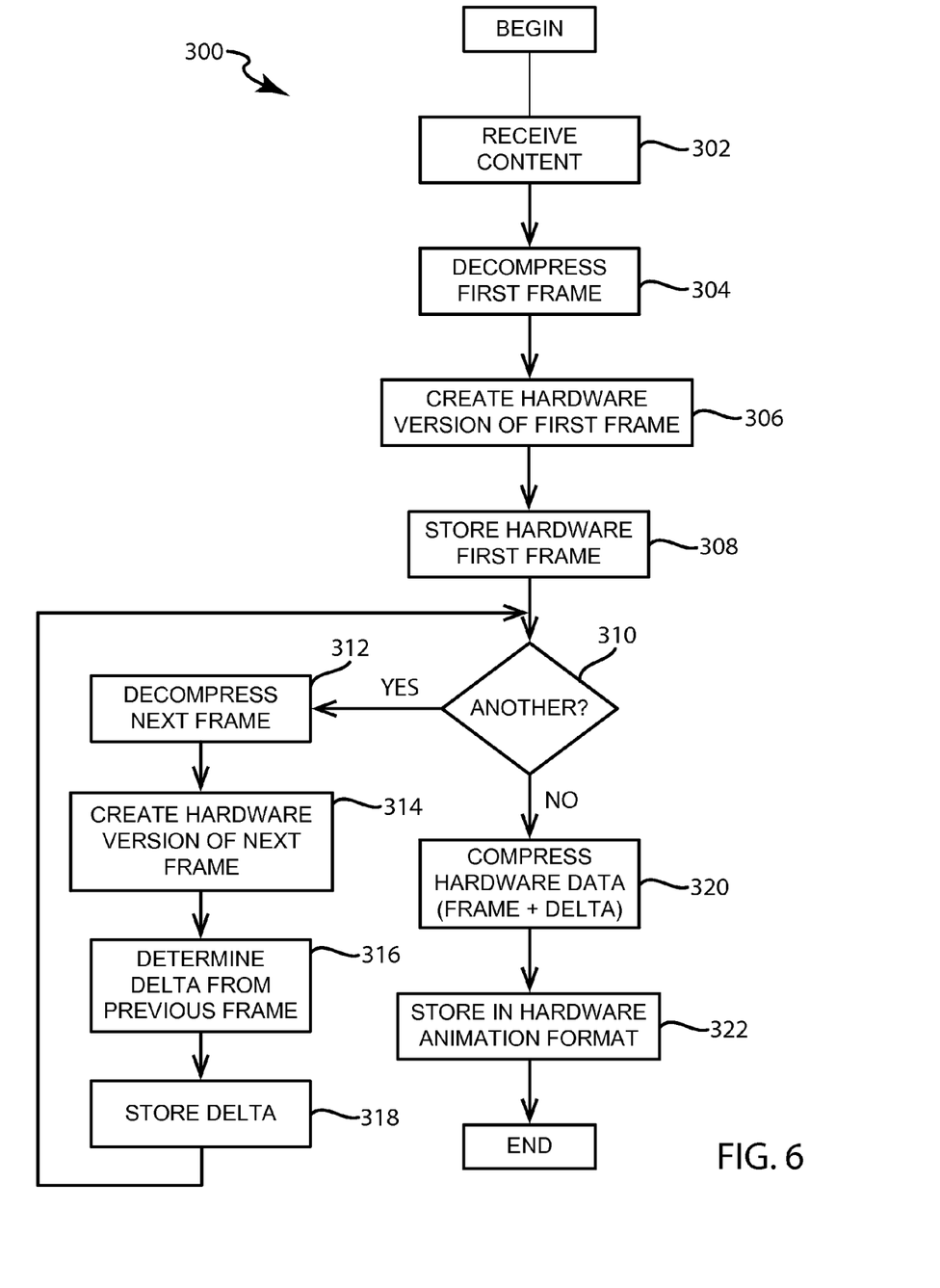
FIG. 6 is a flow chart illustrating a method for rendering images using hardware compatible data.

A method for increasing the upload and rendering time for the frame-based content, such as the content 130 will now be discussed. FIG. 6 is a flow chart illustrating a method for rendering images using hardware compatible data. With reference to FIG. 6, the method 300 may begin with operation 302 and the content 130 is received by the computing device 102. The content 130 may be, for example, an animated sequence, APNG, movie file, flick book, or substantially any other type of visual content including one or more frames. Typically, the content 130 will be a compressed animation or movie sequence and will be received from another computing device, e.g., through the communication/network interface 116, or may be accessed from a storage location, e.g., memory 114, of the computing device 102.

Once the content 302 has been received by the computing device 102, the method 300 proceeds to operation 304. In operation 304, the processing element 110 decompresses the first frame 132*a* from its stored or received format, e.g., Portable Network Graphics (PNG), joint photographic experts group format (JPEG), bitmap (BMP), and other image formats. For example, the processing element 110 applies one or more decompression algorithms to the first frame 132*a* of the content 130 to return the frame 132*a* to an original form or size from its transported or stored size. It should be noted that although the content 130 is discussed as being decompressed frame by frame, in some embodiments a plurality of frames or all of the frames may be decompressed at substantially the same time. The type of decompression will typically depend on the type of image file format of the frame 132*a*.

After the first frame 132*a* has been decompressed, the method 300 proceeds to operation 306. In operation 306, the main processing element 110 creates a first hardware version of the first frame 132*a*. For example, the main processing element 110 transforms the data for the first frame 132*a* from into a 1-3D array of data that can be represented in a specified format, e.g., scalar or vector, the format of the data may be selected based on the memory type of the GPU memory 122, which will allow the first hardware frame 132*a* to be easily used by the GPU 120 at runtime. Examples of hardware texture file formats include, Ericsson Texture Compression (ETC), PowerVR Texture Compression (PVRTC), and S3 Texture Compression (S3TC) (also known as DirectX Texture Compression (DXTC)). The hardware texture file formats may use a fixed compression ratio, where the compression is independent of the image contents, the fixed compression ratio allows the GPU 120 to randomly access the texture data. In a specific example, the hardware texture format may be lossy, fixed-rate compression format such as PVRTC.

After operation 306, the method 300 may proceed to operation 308. In operation 308 the first hardware frame is stored in the main memory 114 of the computing device 102. In instances where the frame is the first frame 132*a* of the content 130, the frame may be stored as a iframe, i.e., the initial frame, or may otherwise be stored so as to indicate that the frame 132*a* is the first frame 132*a* of the content, which as discussed in more detail below, will be the frame form which subsequent frames are based from.

After operation 308, the method 300 may proceed to operation 310. In operation 310, the main processing element 110 determines whether there is another frame to be decompressed. In instances where the content 130 includes animation or movement across frames, there will typically be a plurality of frames for a particular content. If in operation 310, another frame is going to be decompressed, the method 300 proceeds to operation 312.

In operation 312, the second frame 132*b* is decompressed. This operation 312 may be substantially the same as operation 304 and the processing element 110 may apply a decompression algorithm to the original image format of the second frame 132*b* data in order to decompress it. After operation 312, the method 300 may proceed to operation 314. In operation 314, the processing element 110 may create a hardware version of the second frame 132*b*. Again, this operation 314 may be substantially similar to operation 306, and the processing element 110 may transform the data corresponding to the second frame 132b from an image format into a hardware accessible file format that may be easily used by the GPU 120.

Once the second frame 132b has been transformed into the second hardware frame, the method 300 proceeds to operation 316. In operation 316 the processing element 110 determines the delta from the previous frame. Specifically, the processing element 110 analyzes the first frame 132a and the second frame 132b to determine the changes between the two, e.g., the pixels or portions that vary from the first frame 132a. In one embodiment, the processing element 110 may provide a pixel by pixel comparison of the two frames 132a, 132b to determine the changes. For example, the processing element 110 may do a binary compare between a first run-length encoded data string corresponding to the first frame 132a and a second run-length encoded data string corresponding to the second frame 132b to determine the bits that change between the two. In this example, with brief reference to FIG. 3, the main processing element 110 would indicate that the pixels corresponding to the location of the first element 136 have changed between the first frame 132a and the second frame 132b, but the remaining pixels of the other elements in the image may not have changed. Thus, the first delta frame may include data corresponding to the regions of the second frame 132b that are different from the first frame 132a. However, in other embodiments, the processing element 110 may compare the frames in other manners.

After the processing element 110 has compared the first frame 132a and the second frame 132b, both in hardware texture form, the method 300 proceeds to operation 318. In operation 318, the processing element 110 stores the first delta, where the first delta corresponds to the differences between the first frame 132a and the second frame 132b. The first delta is stored in the memory 114 of the computing device 102 and is stored in a hardware compatible format, in particular the, hardware texture file format. The first delta may be a smaller file than the first frame 132a stored in operation 308 as the first delta may the data corresponding to differences between the first frame 132a and the second frame 132b and thus data that is the same between the two frames 132a, 132b may be omitted.

In some instances, the comparisons between two frames may be done before creating the hardware textures for those frames, creating a source delta. However, by creating the hardware textures and then determining the delta, e.g., analyzing the delta in the hardware space, the operations done between hardware frames can be reversed. For example, in some instances an XOR combination of two frames may be used to create the delta frame and by doing this operation in the hardware space the operation can be reversed to recreate the original frames if desired.

After operation 318, the method 300 may return to operation 310. For example, in instances where the content includes three or more frames, operation 310 and operations 312, 314, 316, 318 may be repeated until all of the frames in the content 130 have been analyzed and the deltas for each frame have been created. As a specific example, in instances where the content includes a third frame 132c, the method 300 returns to operation 312 after the first delta has been created. In this example, operations 312, 314, 316, 318 are completed for the third frame 132c with a second delta being determined in operation 316 and stored in operation 318. In one embodiment, the second delta is determined by the processing element 110 analyzing the differences between the second frame 132b and the third frame 132c. In this example, each subsequent frame is analyzed for differences relative to the previous or adjacent frame. In another example, the second delta frame is determined by the processing element 110 analyzing the differences between the first frame 132a and the third frame 132c. In this example, each subsequent frame of the content 130 is analyzed relative to the initial frame.

If all the frames 132a-132d have been analyzed and the deltas for the changes between each of the frames have been stored and there are no additional frames to be analyzed, the method 300 proceeds to operation 320. In operation 320, the processing element 110 compresses the content hardware data. In particular, the main processing element 110 compresses the first hardware frame and the one or more delta frames. For example, the main processing element 110 applies a hardware compression algorithm such as Zlib or LZMA, to the data to the compress it. In other examples, substantially any type of loss-less compression system can be used on top of additional run-length encoded delta compression. In these examples, duplicate data points, such as empty spaces on the delta frames can be removed efficiently.

After operation 320, the method 300 may proceed to operation 322. In operation 322, the content hardware data is stored in the main memory 114. The content hardware data is stored in a file format that can be directly used by the GPU 120, e.g., the texture hardware file format. This allows the content hardware data to be used directly by the GPU 120 without requiring reformatting, translation, or modification to the data prior to rendering. That is, the hardware format of the first hardware compressed frame and delta hardware frames allow the frames to be decompressed by the GPU 120 itself, which allows the frames to remain in a compressed format up until it is used to vary the pixels to display the content 130. A method for rendering the content hardware data created using the method 300 of FIG. 6 will be discussed in more detail below with respect to FIG. 8.

Figure 7:
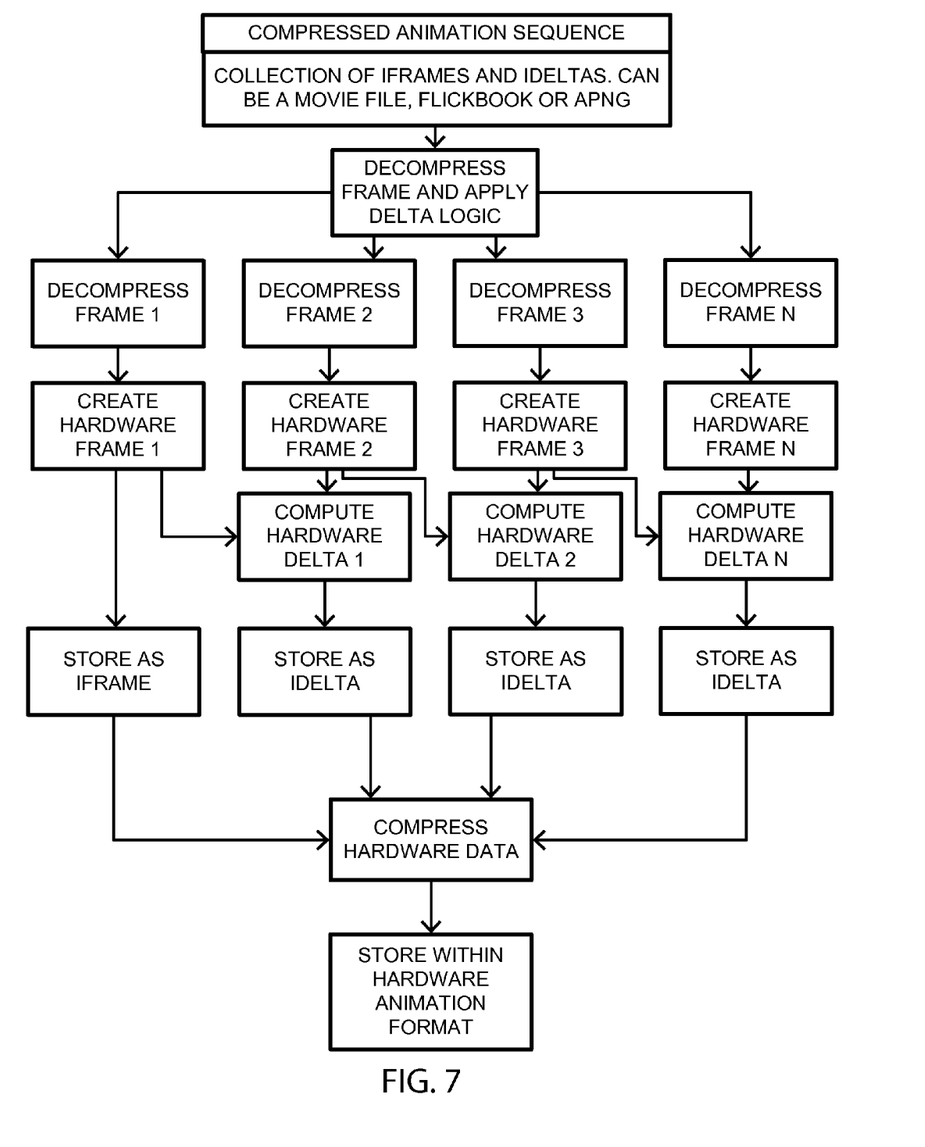
FIG. 7 is a diagram illustrating an example of the method of FIG. 6 being completed in parallel operations.

As briefly mentioned above, in some embodiments one or more operations of the method 300 may be completed in parallel. FIG. 7 is a diagram illustrating an example of the method 300 being completed in parallel operations. As shown in FIG. 7, the frames 132a-132d of the content 130 may be decompressed and the hardware versions of the frames 132a-132d may be created in parallel. However, in other instances, the frames 132a-132d may be analyzed sequentially or in another order from one another.

Figure 8:
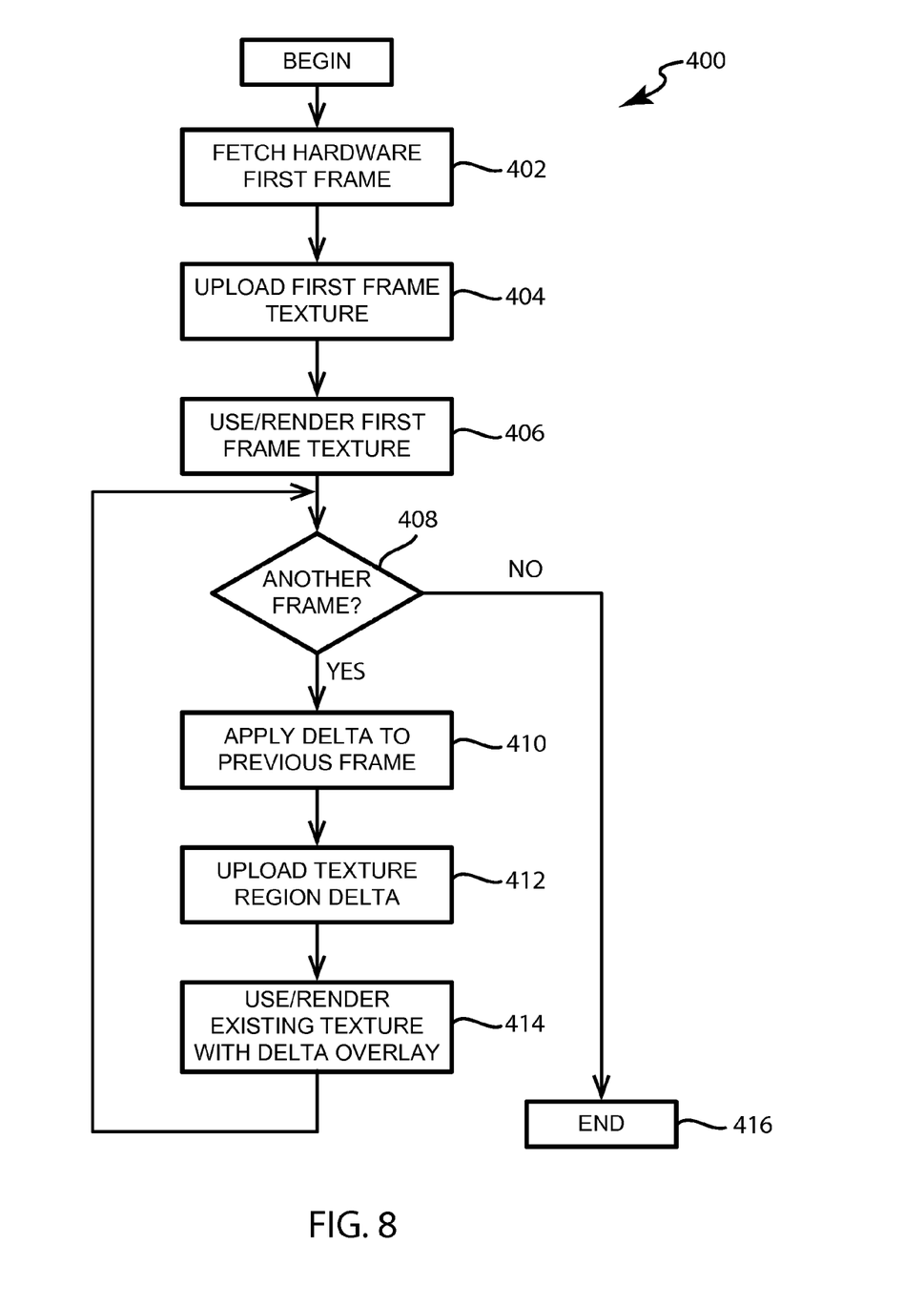
FIG. 8 is a flow chart illustrating a method for rendering the content hardware data.

A method for using the content hardware data created using the method 300 of FIG. 6 will now be discussed in more detail. FIG. 8 is a flow chart illustrating a method 400 for rendering the content hardware data. With reference to FIG. 8, the method 400 may begin with operation 402 and the GPU 120 fetches the first hardware frame from memory 114. During the fetch operation 402, the first hardware texture data is retrieved from memory 114 by the GPU 120. As compared to operation 202 in FIG. 4, operation 402 uses substantially less RAM memory and is faster than the decompressing times of operation 202. This is because the frame hardware texture is compressed and takes less time to transmit, as well as requires less memory space to be stored in as it is transferred from the main memory 114 to the GPU 120.

Once the GPU 120 has fetched the first hardware frame, the method 400 proceeds to operation 404. In operation 404 the first hardware frame is uploaded to the GPU memory 122 or GPU device can include using the glCompressedTexSubImage2D or glCompresssedTexImage2D, which sets the image in the GPU memory 122 to the image from the CPU. For example, the GPU memory 122 receives the data corresponding to the first hardware texture frame from the main memory 114.

After operation 404, the method 400 proceeds to operation 406. In operation 406, the GPU 120 uses the first hardware texture frame. For example, the GPU 120 renders the first hardware texture frame on the display 104 to provide an output to the user. Continuing with this example, once uploaded glActiveTexture can be called on the image that allows reference to the texture during runtime.

As the first hardware frame is being rendered, the method 400 may proceed to operation 408. In operation 408, the processing element 124 determines whether another frame is to be rendered. If another frame is to be rendered, the method 400 proceeds to operation 410. In operation 410 the GPU processing element 124 applies the first delta to the first hardware frame texture. For example, the GPU 120 retrieves the first delta from the GPU memory 122. In some instances logic can be determined on both directions of play between animations. For example, in embodiments where the delta is determined by an XOR operation, the delta can be determined both for forward running of the content as well as reverse running of the content (e.g., a rewind type operation). Further, the delta allows a LOOP back or restart of the frame and/or animation. In this example, a loop delta may be determined that takes the last image as a delta to the first frame and sets the loopback frame to the second frame.

After operation 410, the method 400 proceeds to operation 412. In operation 412, the GPU 120 uploads a delta texture region corresponding to the first delta to the GPU processing element 124. In this example, the upload time is substantially reduced as compared to the uploading time in the method 200 of FIG. 4. This is because method 300, the entire texture for the frame is uploaded to set the image in the GPU memory to the delta image. However, in the method of FIG. 8, the first delta hardware texture is uploaded, which includes data for the changed portions of the first hardware frame texture and so has a reduced size as compared to a frame including the entire second frame hardware texture. Thus, the data uploaded is smaller which reduces the amount of time for the upload to complete, as well as reduces the memory required for the uploading process.

After operation 412, the method 400 may proceed to operation 414. In operation 414, the GPU 120 renders the existing texture of the first hardware texture frame with the first delta hardware texture overlaid to create the second frame 132b of the content 130. After operation 414, the method 400 returns to operation 408 to determine if anther frame is to be rendered. If in operation 408 another frame is not desired, the method 400 proceeds to an end state 416. If in operation 408 another frame is desired, the method 400 returns to operations 410, 412, 414 which repeat for each frame of the content 130, with the corresponding delta frames being uploaded and rendered, allowing reference to the texture at runtime. Because the hardware texture data used by the GPU 120 and memory 114 in FIG. 8 is in a format that is readily accessed by the GPU 120, the content 130 can be rendered and displayed faster and with less memory resources than is required by the method 200 of FIG. 4. This is because the GPU 120 does not have to swizzle or otherwise modify the content data into a format that is usable and thus can immediately use the hardware content data.

Figure 9:
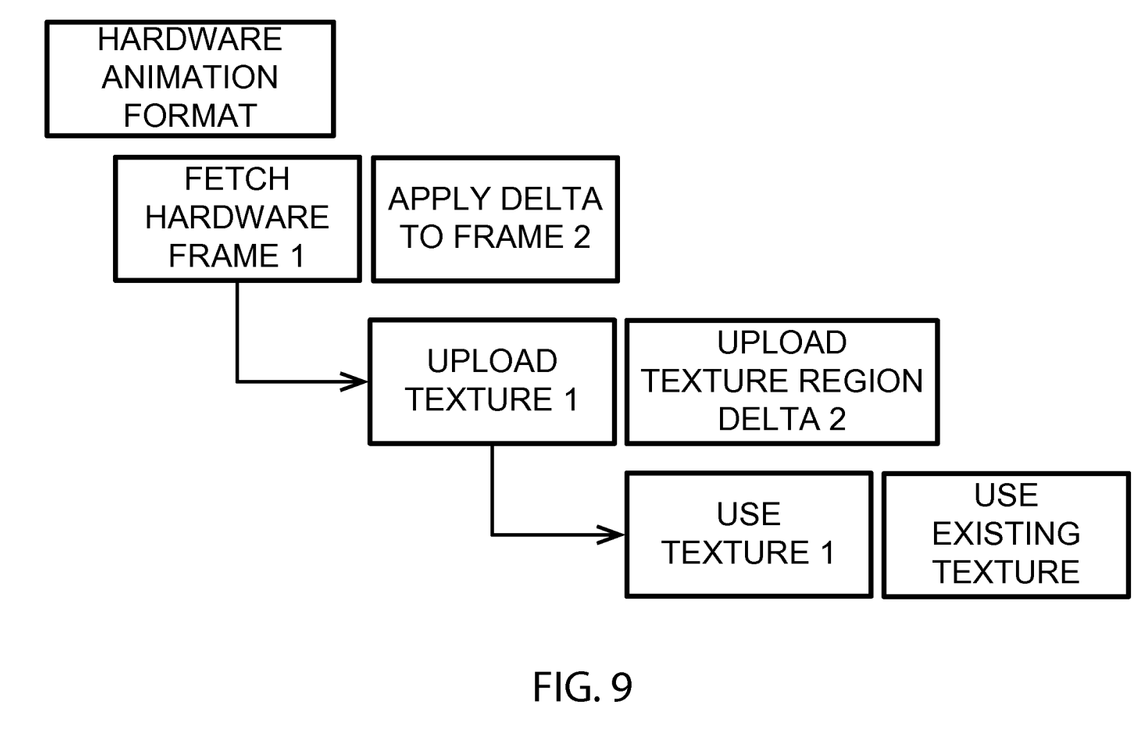
FIG. 9 is a flow chart illustrating another example of the method of FIG. 8 utilizing a buffer structure.

FIG. 9 is a diagram flow chart illustrating an example of the method 400. In particular, FIG. 9 illustrates an example of hardware animation using a single buffer in place playback.

Figure 10:
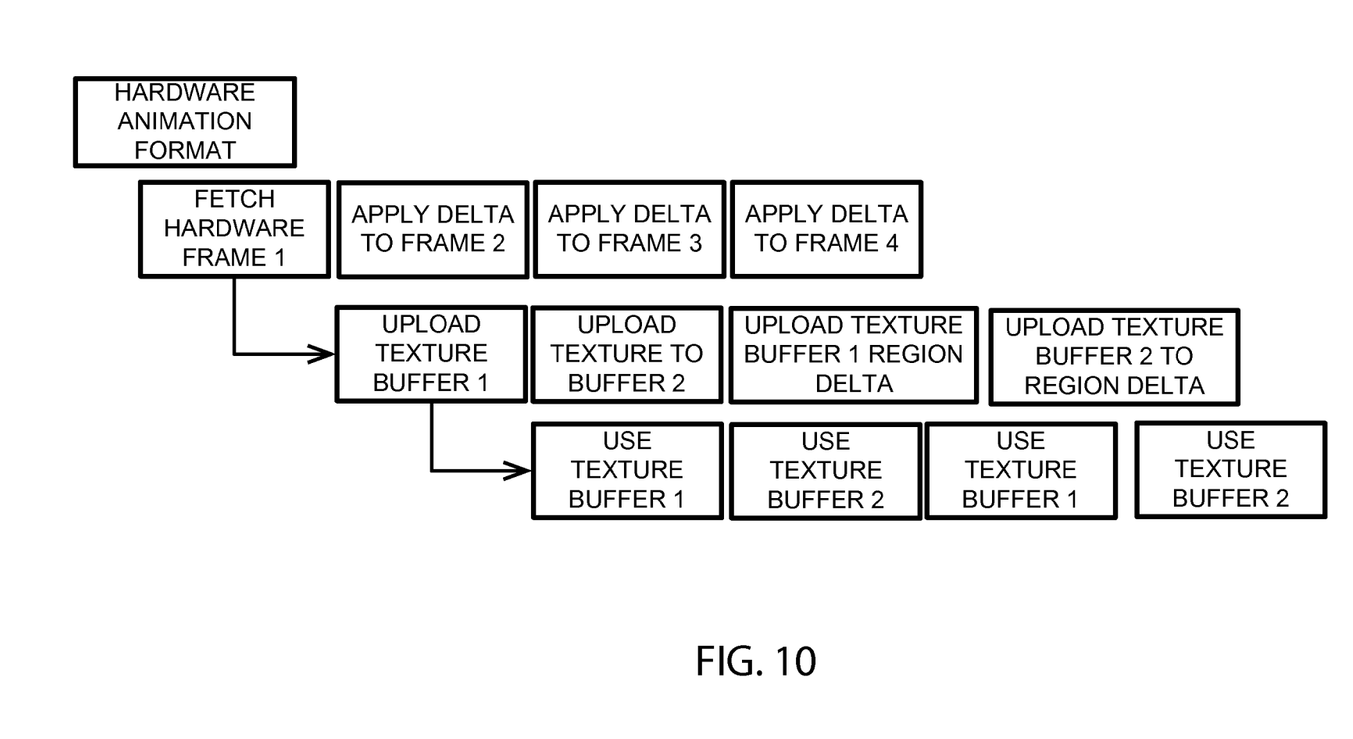
FIG. 10 is a flow chart illustrating another example of the method of FIG. 8 utilizing a double buffer structure.

It should be noted that in some embodiments, a single buffer or a multiple buffer system may be used to render the content hardware texture. For example, the methods of FIGS. 8 and 9 illustrate a single buffer system where the first hardware texture frame and the subsequent delta hardware texture frames are uploaded to the GPU memory 122 sequentially and the GPU 122 renders each texture from the same buffer, e.g., one in one out. However, in other examples, a double buffer or other multiple buffer structure may be used. For example, FIG. 10 illustrates the method of FIGS. 8 and 9 being executed in a double buffer structure. In this example, after being fetched from the memory 114, the first hardware frame texture is uploaded to a first buffer and then used by the GPU 120 for rendering. While the first frame texture is being rendered, the first delta is applied to the first frame texture and then the second frame hardware texture is uploaded to a second buffer. Once the first frame has been rendered, the GPU 120 renders the second hardware texture from the second buffer. While the second frame is being rendered, a second delta is applied to the second frame and the third frame texture is uploaded to the first buffer. After the second frame has been rendered, the GPU 120 uses the third frame from the first buffer to render the third frame. In other words, the two buffers alternate in receiving hardware texture frames for rendering, which allows the content to be rendered faster as each frame can be ready for use in one of the buffers while the previous frame is being rendered.

In embodiments where a double buffer system is used, the method allows rendering to a second frame while the first frame is being used for rendering. The double buffer structure helps to prevent the GPU 120 from stalling when updating a frame, which helps to prevent image tearing and the like. For example, in typical MPEG video compression, a stream that plays into the GPU buffer can tear as the data cannot be updated while being rendered. On the contrary, the double buffer structure of FIG. 10 allows for the data to be updated while it is being rendered which prevents the image from tearing and provides a glitch-free playback.

FIGS. 9 and 10 illustrate methods for displaying the content hardware data created in FIG. 6. However, it should be noted that other display and rendering processes may be used and the above examples are meant as illustrative only.

CONCLUSION

The foregoing description has broad application. For example, while examples disclosed herein may focus on animated images, it should be appreciated that the concepts disclosed herein may equally apply to closing other type of image output formats, such as video files (MPEG) and the like. Accordingly, the discussion of any embodiment is meant only to be exemplary and is not intended to suggest that the scope of the disclosure, including the claims, is limited to these examples.

What is claimed is:

1. A method for creating content in a hardware texture format comprising:
   receiving by a processor the content in an image file format, wherein the content includes a first frame and a second frame;
   creating by the processor a first hardware file corresponding to the first frame;
   creating by the processor a second hardware file corresponding to the second frame; and
   comparing by the processor a first plurality of texels of the first hardware file to a second plurality of texels of the second hardware file by performing an XOR combination of the first hardware file and the second hardware file to determine a first delta hardware file corresponding to changes between the first plurality of texels of the first hardware file and the second plurality of texels of the second hardware file;

wherein the first hardware file, the second hardware file, and the first delta hardware file include data directly usable by a graphics processing unit.

2. The method of claim 1, further comprising
storing in a memory component the first hardware file; and
storing in the memory component the first delta hardware file.

3. The method of claim 2, further comprising compressing the first hardware file and the first delta hardware file into a compressed hardware texture.

4. The method of claim 3, further comprising storing in the memory component the compressed hardware texture, wherein the compressed hardware texture corresponds to the content.

5. The method of claim 1, wherein creating the first hardware file comprises transforming the first frame of the content from the image file format into a hardware format.

6. The method of claim 1, further comprising:
creating by the processor a third hardware file corresponding to a third frame of the content; and
determining by the processor a second delta file corresponding to changes between the second hardware file and the third hardware file.

7. The method of claim 1, wherein the first hardware file, the second hardware file, and the first delta file are in a texture hardware format that is a lossy, fixed-rate texture compression file format.

8. A method for displaying frame based content on a display comprising:
receiving by a graphics processing unit a hardware animation content file;
uploading a first texture frame comprising a first texture to a memory component of the graphics processing unit;
rendering for display at a first time, directly by the graphics processing unit, the first texture from the first texture frame;
generating by the graphics processing unit a first delta frame by performing an XOR combination of the first texture frame and a second texture frame;
applying by the graphics processing unit the first delta frame to the first texture frame to determine a first texture delta frame, wherein the first texture delta frame corresponds to the second texture frame;
uploading the first texture delta frame; and
rendering for display at a second time, by the graphics processing unit, an output image comprising the first texture and the first texture delta frame overlaid on the first texture.

9. The method of claim 8, wherein the hardware animation content comprises the first texture frame and a plurality of delta frames, wherein the delta frames comprise data changes between the first texture frame and a respective texture delta frame.

10. The method of claim 8, wherein the display is integrated into a mobile computing device.

11. The method of claim 8, wherein uploading the first texture frame comprises uploading the first texture frame to a first buffer in communication with the graphics processing unit.

12. The method of claim 8, wherein uploading the first texture delta comprises uploading the first texture delta to a second buffer in communication with the graphics processing unit.

13. A computing device comprising:
a display;
a memory component; and
a main processing unit in communication with the display and the memory component, wherein the main processing unit is configured to perform the following operations:
decompressing a content file;
creating a plurality of texture frames from the decompressed content file, the plurality of texture frames comprising an initial texture frame for display at a first time and a plurality second texture frames for display at a plurality of times subsequent to the first time;
storing the initial texture frame in the memory component; and
storing a plurality of delta frames in the memory component, wherein the plurality of delta frames comprise change data indicating changes determined by an XOR combination of the initial texture frame and a respective second texture frame.

14. The computing device of claim 13, wherein the main processing unit further performs the following operations:
compressing the initial texture frame and the plurality of delta frames into a content texture file; and
storing the content texture file in the memory component.

15. The computing device of claim 14 further comprising a graphics processing unit in communication with the main processing unit, wherein the graphics processing unit is configured to perform the following operations:
fetching the content texture file; and
rendering the content texture file to display the content on the display.

16. The computing device of claim 15, wherein rendering the content texture file comprises:
rendering the initial texture frame; and
overlaying each delta frame over the initial texture frame.

* * * * *